(12) United States Patent
Dowdle

(10) Patent No.: US 7,247,954 B1
(45) Date of Patent: Jul. 24, 2007

(54) PORTABLE AC POWER SYSTEM

(76) Inventor: Geraldine Dowdle, 165 Cheyenne Trail, Medford Lakes, NJ (US) 08055

( * ) Notice: Subject to any disclaimer, the term of this patent is extended or adjusted under 35 U.S.C. 154(b) by 388 days.

(21) Appl. No.: 10/764,366

(22) Filed: Jan. 23, 2004

(51) Int. Cl.
*H02J 7/00* (2006.01)
(52) U.S. Cl. ....................................... 307/150
(58) Field of Classification Search ................ 307/150
See application file for complete search history.

(56) References Cited

U.S. PATENT DOCUMENTS

| 2,555,630 | A | * | 6/1951 | Bishner ........................ 363/13 |
| 5,159,258 | A | * | 10/1992 | Kolvites et al. ............ 320/113 |
| 5,616,968 | A | * | 4/1997 | Fujii et al. .................... 307/66 |
| 6,077,109 | A | | 6/2000 | Prazoff |
| 6,102,549 | A | | 8/2000 | Thomas et al. |
| 6,268,077 | B1 | * | 7/2001 | Kelley et al. ................. 429/33 |
| 6,350,040 | B1 | | 2/2002 | Parker |
| 6,577,098 | B2 | * | 6/2003 | Griffey et al. .............. 320/104 |
| 2005/0156564 | A1 | * | 7/2005 | Krieger ...................... 320/112 |

\* cited by examiner

*Primary Examiner*—Robert L. Deberadinis

(57) ABSTRACT

A portable ac power system for providing cordless remote electrical power. The portable ac power system includes a pair of portable power supply devices, and a recharging assembly. The pair of portable power supply devices each including a portable housing, an outlet, and an energy storage assembly, the outlet is designed for coupling with conventional electrical plugs. The recharging assembly is electrically couplable to a conventional household ac outlet. The recharging assembly is preferably electrically couplable to each one of the pair of portable power supply devices. The energy storage assembly is for recharging the portable power supply devices.

1 Claim, 3 Drawing Sheets

PORTABLE AC POWER SYSTEM

BACKGROUND OF THE INVENTION

1. Field of the Invention

The present invention relates to electrical service extension devices and more particularly pertains to a new portable ac power system for providing cordless remote electrical power.

2. Description of the Prior Art

The use of electrical service extension devices is known in the prior art. U.S. Pat. No. 6,077,109 describes a device providing remote electrical power, but requiring an cord assembly as an extension from a conventional outlet.

While these devices fulfill their respective, particular objectives and requirements, the need remains for a system that allows conventional household electrical items to be run without a wired connection to a conventional outlet.

SUMMARY OF THE INVENTION

The present invention meets the needs presented above by providing an electrical storage device coupled with an inverter for providing cordless electrical power where desired.

Another object of the present invention is to provide a new portable ac power system that provides an indication of when recharging of the energy storage devices is complete.

Even still another object of the present invention is to provide a new portable ac power system that can be used without special electrical connections.

To this end, the present invention generally comprises a pair of portable power supply devices, and a recharging assembly. The pair of portable power supply devices each including a portable housing, an outlet, and an energy storage assembly, the outlet is designed for coupling with conventional electrical plugs. The recharging assembly is electrically couplable to a conventional household ac outlet. The recharging assembly is preferably electrically couplable to each one of the pair of portable power supply devices. The energy storage assembly is for recharging the portable power supply devices.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

The objects of the invention, along with the various features of novelty which characterize the invention, are pointed out with particularity in the claims annexed to and forming a part of this disclosure.

BRIEF DESCRIPTION OF THE DRAWINGS

The invention will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
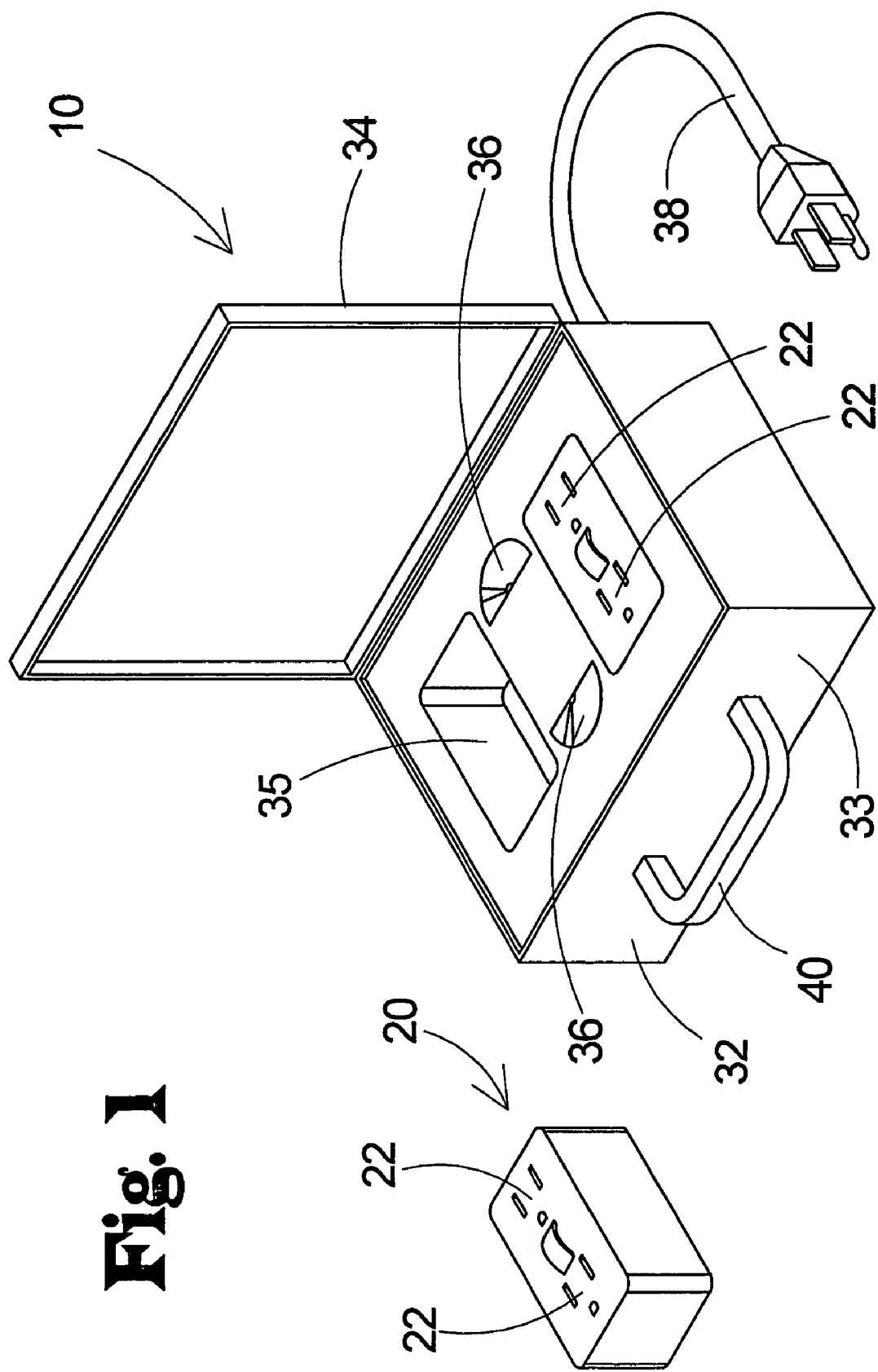
FIG. 1 is a schematic perspective view of a new portable ac power system according to the present invention.
Figure 2:
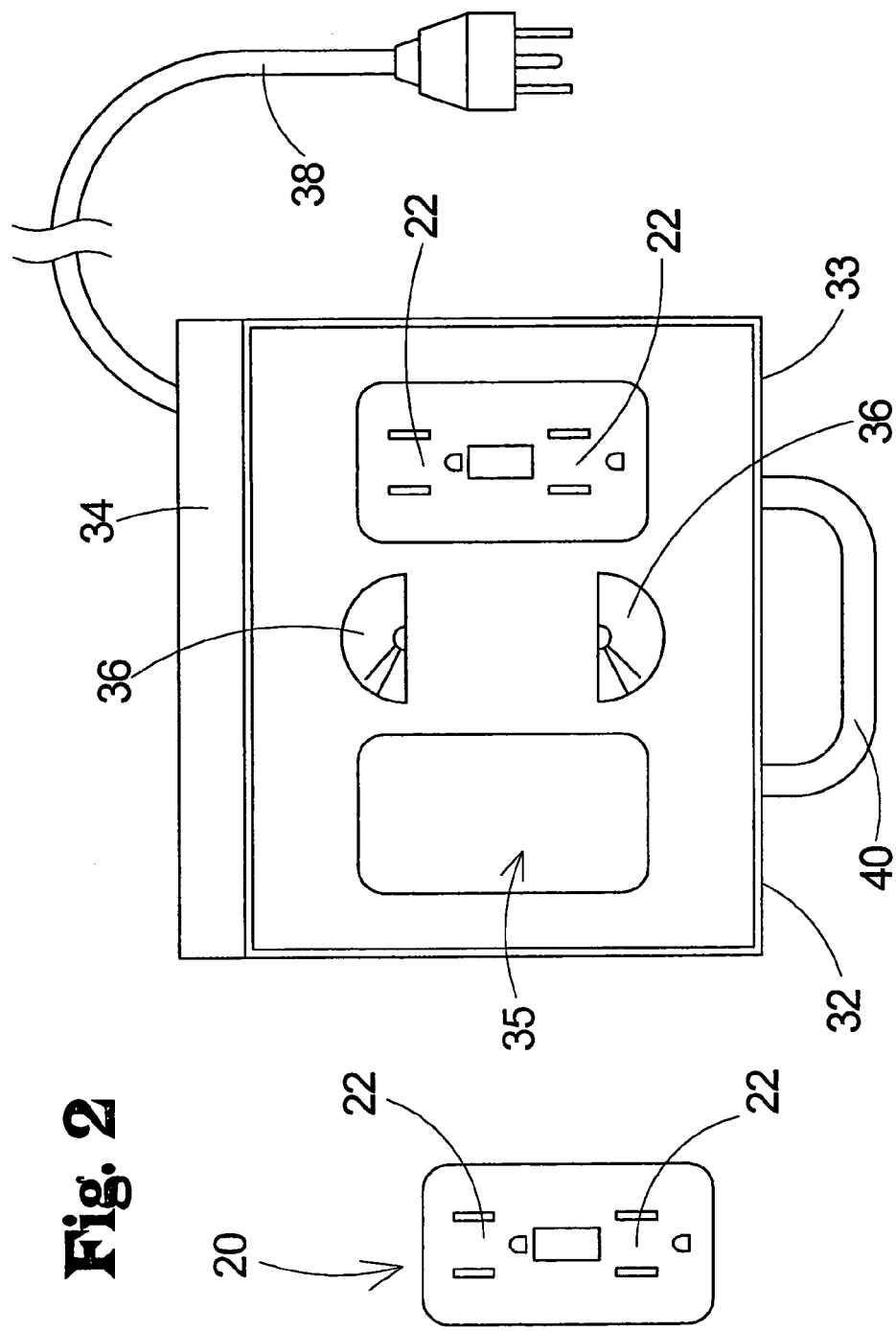
FIG. 2 is a schematic top view of the present invention.
Figure 3:
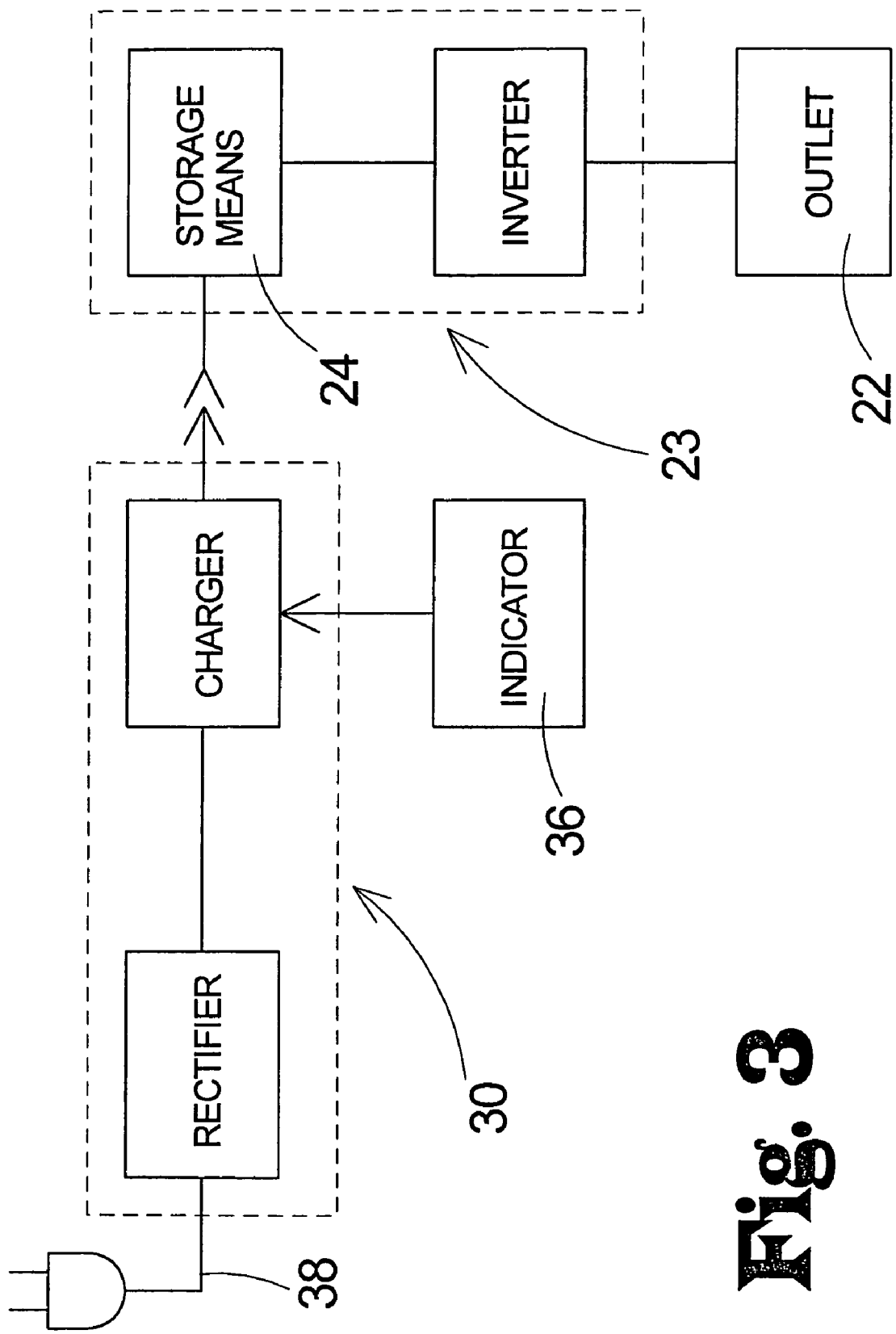
FIG. 3 is a schematic functional interconnect of the present invention.

With reference now to the drawings, and in particular to FIGS. 1 through 6 thereof, a new portable ac power system embodying the principles and concepts of the present invention and generally designated by the reference numeral 10 will be described.

As best illustrated in FIGS. 1 through 6, the portable ac power system 10 generally comprises a pair of portable power supply devices 20, and a recharging assembly 30.

The recharging assembly 30 is electrically couplable to a conventional household ac outlet. The recharging assembly 30 is preferably electrically couplable to each one of the pair of portable power supply devices 20. The recharging assembly 30 is for recharging the portable power supply devices 20.

The recharging assembly 30 further comprises a case 32 with a main portion 33 and a lid portion 34. Preferably, the main portion 33 includes a pair of cavities 35. Each one of the pair of cavities 35 is for selectively receiving an associated one of the pair of portable power supply devices 20. The recharging assembly 30 includes an electrical cord assembly 38 extending from the main portion 33 for selectively coupling to a conventional household outlet.

In a preferred embodiment, the recharging assembly 30 has a handle member 40 to facilitate transport of the system 10.

A pair of charge indicators 36 may be positioned in the main portion 33 of the recharging assembly 30. Each one of the pair of charge indicators 36 is electrically couplable to an associated one of the pair of portable power supply devices 20 for indicating an amount of electrical energy stored in the portable power supply devices 20.

In an embodiment each one of the pair of portable power supply devices 20 further comprises a portable housing 21, an outlet 22, and an energy storage assembly 23. The portable housing 21 defines an interior space, and includes a top wall. The outlet 22 is preferably positioned on the top wall of the housing 21. The outlet 22 is designed for coupling with conventional electrical plugs.

An energy storage assembly 23 is positioned within the housing 20. The energy storage assembly 23 is electrically coupled to the outlet 22 and supplies electrical energy to the outlet 22.

In a further embodiment each one of the pair of energy storage assemblies 23 further comprises an energy storage means 24, and an inverter assembly 26. The energy storage means 24 is preferably positioned within the portable housing 21. The energy storage means 24 stores electrical energy until needed by a user. The inverter assembly 26 is electrically coupled between the energy storage means 24 and the outlet 22. The inverter assembly 26 converts dc electrical current from the energy storage means 24 to ac current for the outlet 22. The inverter assembly 26 is positioned within the portable housing 21.

The energy storage means 24 may be a battery, capacitor, fuel cell, or any other appropriate device.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A portable AC power system for use with conventional household electrical items, comprising:
   a pair of portable power supply devices, each of said portable power supply devices comprising:
      a portable housing defining an interior space, said portable housing having a top wall;
      an outlet positioned on said top wall of said housing, said outlet being configured to removably receive conventional electrical plugs; and
      an energy storage assembly positioned within said housing, said energy storage assembly being electrically coupled to said outlet, said energy storage assembly being configured to receive electrical energy, store electrical energy, and supply electrical energy to said outlet;
   a recharging assembly, said recharging assembly being electrically couplable to a conventional household AC outlet, said recharging assembly being electrically couplable to each one of said pair of portable power supply devices, said energy storage assembly for recharging said portable power supply devices;
   said recharging assembly further comprises a case having a main portion and a lid portion, said main portion defining a pair of cavities therein, each one of said pair of cavities cavity being configured to removably receive the housing of an associated one of said pair of portable power supply devices, said recharging assembly having an electrical cord assembly extending from said main portion for selectively coupling to a conventional household outlet;
   said recharging assembly further comprises a handle member to facilitate transport of said system;
   a pair of charge indicators positioned in said main portion of said recharging assembly, each one of said pair of charge indicators being electrically couplable to an associated one of said pair of portable power supply devices such that said charge indicator indicates an amount of electrical energy stored in said associated portable power supply device;
   wherein each one of said pair of portable power supply devices further comprises:
      a portable housing defining an interior space, said portable housing having a top wall;
      an outlet positioned on said top wall of said housing, said outlet being adapted for coupling with conventional electrical plugs;
      an energy storage assembly positioned within said housing, said energy storage assembly being electrically coupled to said outlet, said energy storage assembly supplying electrical energy to said outlet;
   wherein each one of said pair of portable power supply devices further comprises:
      an energy storage means positioned within said portable housing, said energy storage means storing electrical energy until needed by a user; and
      an inverter assembly electrically coupled between said energy storage means and said outlet, said inverter assembly converting dc electrical current from said energy storage means to ac current for said outlet, said inverter assembly being positioned within said portable housing;
   wherein said energy storage means comprises an energy storage device selected from a group of energy storage devices consisting of battery, capacitor, and fuel cell; and
   wherein each said cavity of said main portion substantially corresponds to a size and shape of an outer surface of the portable housing of an associated one of said portable supply devices so that said top wall of said portable housing is exposed when said portable housing is situated in said cavity.

* * * * *